J. H. ASTRUCK.
COVER FOR CONTAINERS.
APPLICATION FILED MAR. 29, 1913.
1,096,343. Patented May 12, 1914.
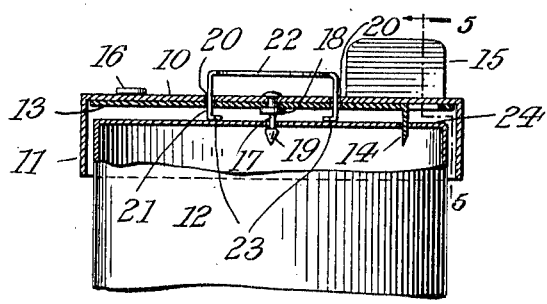
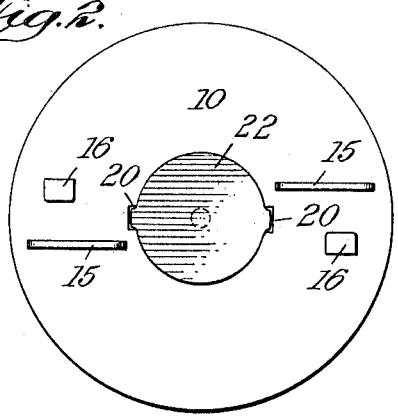 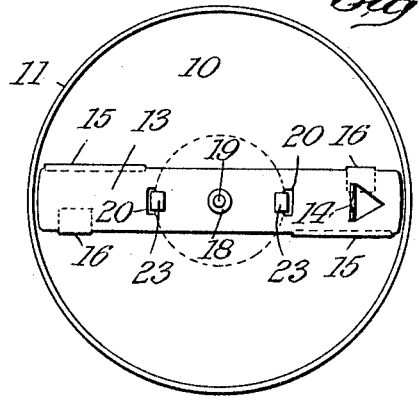
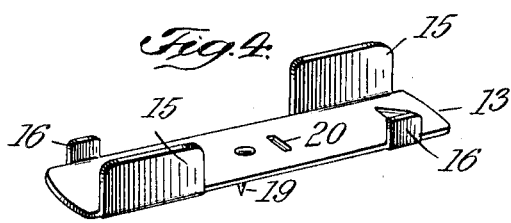
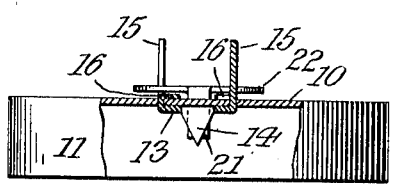
Witnesses:
Inventor
John H. Astruck
By his Attorneys

UNITED STATES PATENT OFFICE.

JOHN H. ASTRUCK, OF NEW YORK, N. Y.

COVER FOR CONTAINERS.

1,096,343.  Specification of Letters Patent.  Patented May 12, 1914.

Application filed March 29, 1913. Serial No. 757,593.

*To all whom it may concern:*

Be it known that I, JOHN H. ASTRUCK, a citizen of the United States, residing at New York city, county and State of New York, have invented a new and Improved Cover for Containers, of which the following is a specification.

This invention relates to a cover for cans, bottles, jars and similar containers which is adapted to sever the cover of the original package, and to replace the same while the contents of the container are from time to time removed for consumption.

In the accompanying drawing: Figure 1 is a vertical central section of a cover embodying my invention; Fig. 2 a plan; Fig. 3 a bottom view; Fig. 4 a perspective view of the cutter bar before being attached to the cover, and Fig. 5 a section on line 5—5, Fig. 1.

The cover 10 is provided with a depending flange 11 and is of a size to loosely fit the container 12, so that it may be freely turned thereon. Across the inner face of the cover there extends diametrically a cutter bar 13 which, at a distance from flange 11, carries a cutting blade 14. Bar 13 is provided near each of its ends with a finger piece 15 and with a lug 16, the two finger pieces as well as the two lugs being formed at opposite edges of the bar. Finger pieces 15 extend upwardly through corresponding slots of cover 10, so that they may be readily grasped for the purpose of turning the cover. Lugs 16 likewise extend upwardly through slots of the cover, but they are upset against the upper side thereof, thus constituting means for securely attaching the cutter bar to the cover. Through the center of the cover and the cutter bar, there extends the shank 17 of a depending centering pin held in place by a collar 18 and provided with a coniform arrow or spear head 19. To the right and left of the centering pin, the cover as well as the cutter bar is slotted as at 20 for the accommodation of a pair of shanks 21 depending from a disk or movable member 22, which is arranged centrally over cover 10, the ends of shanks 21 being bent inwardly as at 23. The disk together with its shanks, constitutes a stripper which is freely movable vertically, but is prevented by the flanges 23, from being separated from the cover.

In use, the cover constructed as described, is placed over the top of the container 12, which is delivered to the household tightly closed by its own head or cover 24. Pressure being applied to cover 10, its cutter 14 as well as its spear head 19 will be thrust through cover 24 and by then revolving cover 10, the cutter will entirely sever cover 24 from the container. The cover thus severed, will become speared upon the centering pin, so that it will become temporarily attached to the cover 10 and will not drop into the container. After cover 10 together with the detached cover 24 has been removed, pressure is applied to disk 22, whereby the shanks 21 will strip cover 24 off the spear head, so that cover 10 will now be free and clear, and may be used to close the container, while its contents are being gradually withdrawn for use.

I claim:

1. A device of the character described, comprising a cover, a cutter bar secured thereto, a cutter and a centering pin depending from the bar, a movable stripper-member, above the cover, a stripping shank passing from said member through the cover, and means for securing said stripping shank to the cover in movable relation thereto.

2. A device of the character described, comprising a cover, a cutter bar secured to the lower side thereof, a cutter carried by said bar, a spear-headed pin depending from the bar, a disk above the cover and movable relatively thereto, and a pair of shanks on said disk that pass through the cover at opposite sides of the pin.

JOHN H. ASTRUCK.

Witnesses:
FRANK V. BRIESEN,
KATHERYNE KOCH.